United States Patent [19]

De Martelaere et al.

[11] 4,201,056
[45] May 6, 1980

[54] BRAKE BLEEDER ADAPTER

[75] Inventors: David L. De Martelaere, Troy; William E. Bogard, Sterling Heights, both of Mich.

[73] Assignee: Kent-Moore Corporation, Mich.

[21] Appl. No.: 901,593

[22] Filed: May 1, 1978

[51] Int. Cl.² .......................... B60T 11/30; F15B 7/10
[52] U.S. Cl. ...................................... 60/584; 188/352
[58] Field of Search ................... 60/584, 585; 188/352

[56] References Cited
PUBLICATIONS

"Brake and Front End"; Jun. 1978, p. 35, Adv. Relating to Bleeding Plastic Tank Master Cylinders, EIS Automotive Corp., Middletown Conn.
1977 Kent-Moore Catalog, p. 53.

*Primary Examiner*—Edgar W. Geoghegan
*Attorney, Agent, or Firm*—Burton, Parker & Schramm

[57] ABSTRACT

A brake bleeder adapter, for use with automotive brake system master cylinders having reservoirs which should not be subjected to clamping and/or bleeding pressures as was done according to prior methods of brake bleeding, connects the hydraulic brake system of the automobile to a supply of pressurized brake fluid without subjecting the reservoir to such pressures during the process of bleeding the brakes. When securing this adapter to the brake system, the master cylinder fluid reservoir is essentially by-passed and the adapter is connected directly to the master cylinder. Entrained air within the replacement brake fluid is effectively prevented from entering the brake system by either releasing such air from the fluid or confining it to the fluid remaining in the adapter thus reducing the time needed to complete the bleeding process.

12 Claims, 2 Drawing Figures

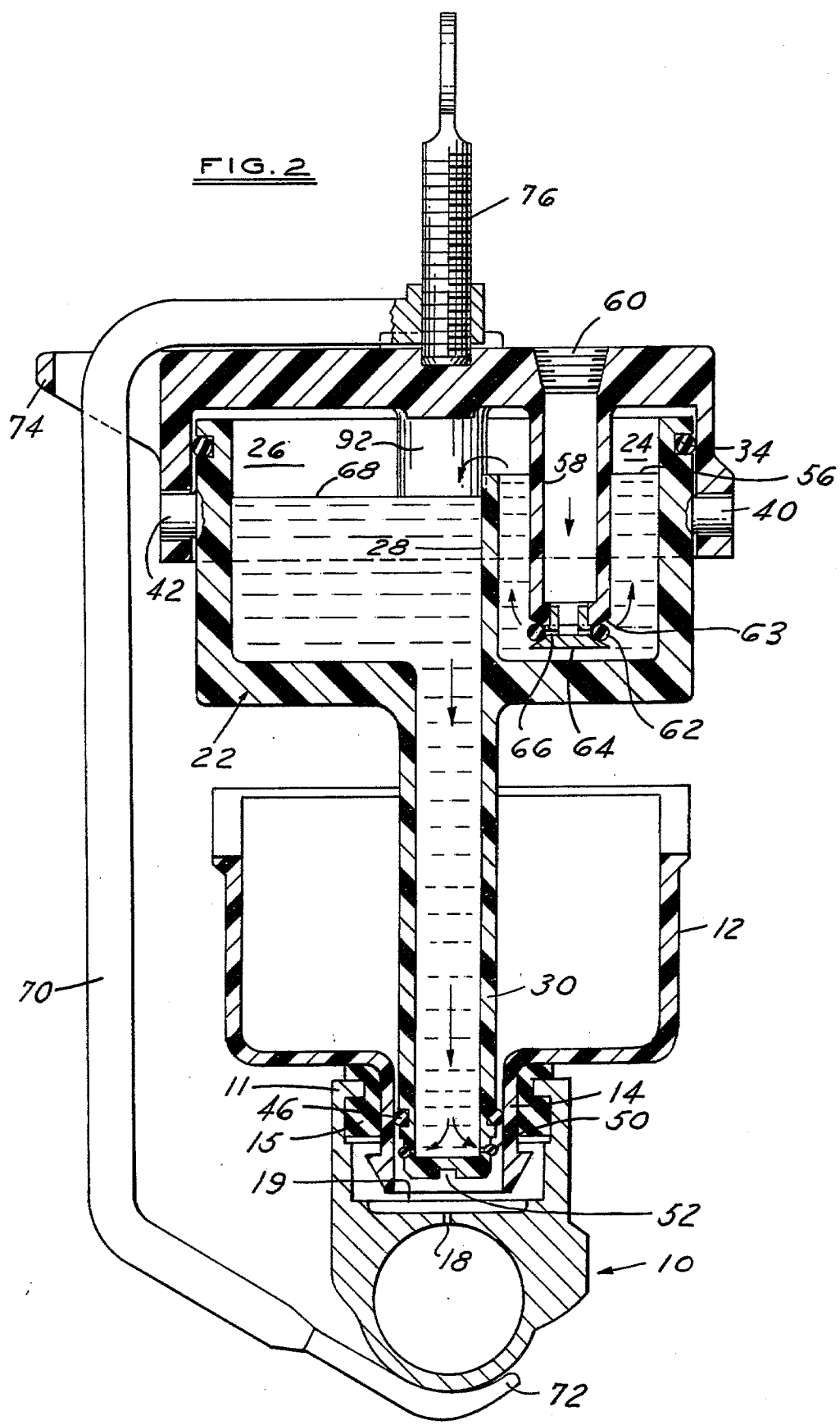

BRAKE BLEEDER ADAPTER

FIELD OF INVENTION

This invention relates to devices facilitating the rapid bleeding of automotive hydraulic braking systems by forcing replacement brake fluid under pressure into the brake system at the master cylinder while the brake lines are opened at the individual wheel cylinders. More particularly the invention relates to an adapter for connecting what is termed a power bleeder directly to the fill ports of the master cylinder while effectively bypassing the master cylinder reservoir.

BACKGROUND OF THE INVENTION

With the increased emphasis in weight reduction of the automobile, the master cylinder reservoir of the hydraulic brake system of at least one well known make of automobile is now being made of a relatively fragile plastic type material which should not be subjected to the clamping or fluid pressures to which prior master cylinder reservoirs have been heretofore subjected during power bleeding of the hydraulic brake system. Such prior reservoirs were fabricated of cast iron or other sufficiently tough material that they could withstand clamping or fluid pressures without danger of fracture.

SUMMARY OF THE INVENTION

The present invention is based upon the concept of providing an improved brake bleeder adapter having the capability of injecting pressurized brake fluid which is substantially non-aerated into the master cylinder without securing the adapter to the fragile reservoir of the master cylinder, but rather securing the adapter to the master cylinder itself. The apparatus involved is vertically secured to the master cylinder by means of a clamping device or the like with a leg portion extending down through the reservoir to communicate with fill ports of the master cylinder. The leg portion blocks the master cylinder from communication with the master cylinder reservoir and is provided with means which permits flow in only one direction and prevents leakage of brake fluid from the adapter when it is removed from the master cylinder. The adapter has a body portion comprising two chambers separated by a wall or weir. Brake fluid under pressure is delivered in a somewhat aerated condition to one of the chambers from which it flows over the wall into the other chamber for releasing pockets of air within the fluid or confining the air bubbles to the free surface of the brake fluid such that the fluid delivered from the latter chamber to the master cylinder is in a substantially air-free condition.

BRIEF DESCRIPTION OF THE DRAWINGS

FIG. 2 is a cross-sectional view of the brake bleeder adapter taken along line 2—2 of FIG. 1.

BRIEF DESCRIPTION OF PREFERRED EMBODIMENTS

Figure 1:
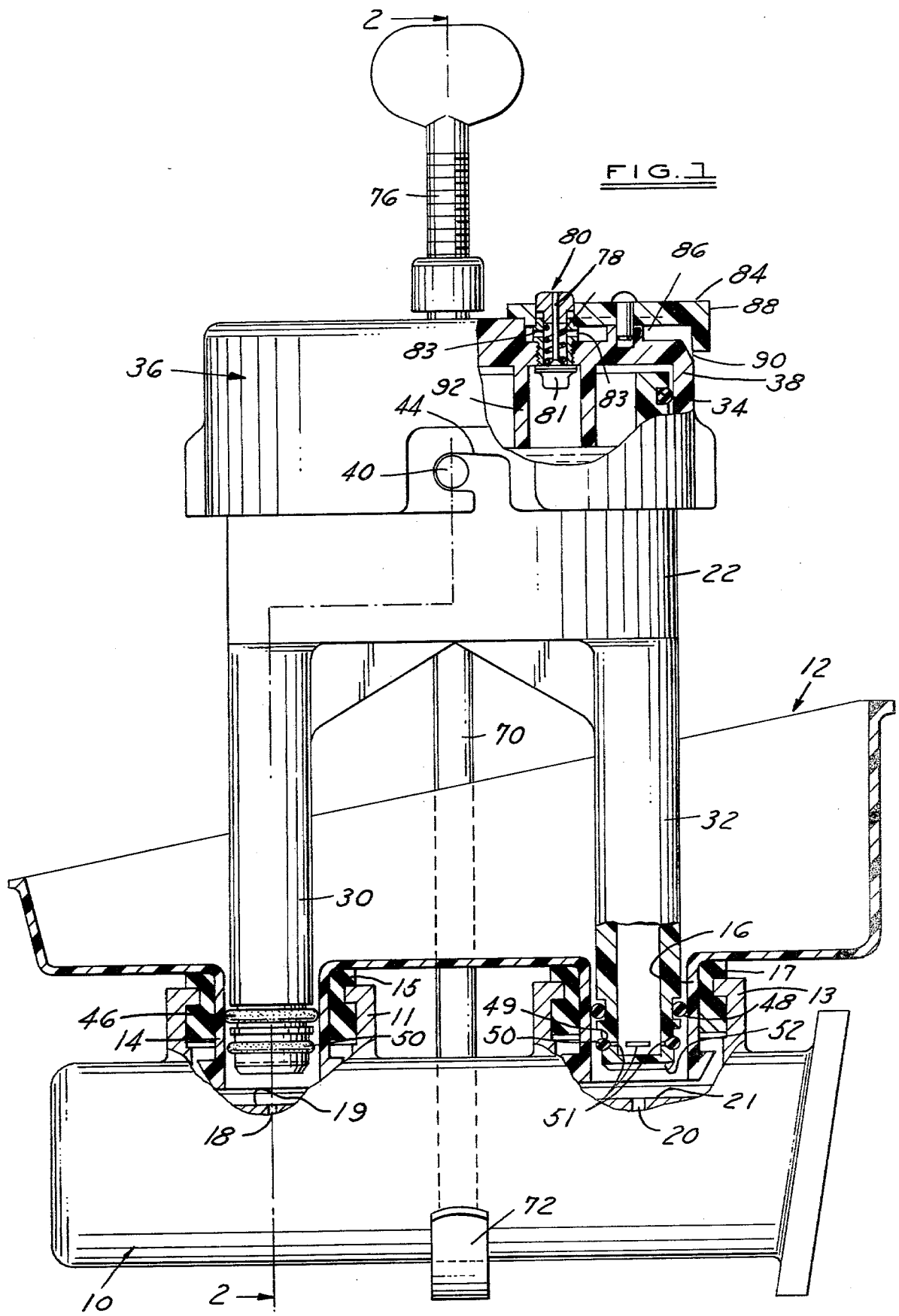
FIG. 1 is a side view of a brake bleeder adapter embodying the invention secured to a master cylinder.

As shown in the drawings a master cylinder 10 for an automatic hydraulic braking system supports a brake fluid reservoir 12 which is intended to hold a reserve supply of brake fluid during normal operation of the braking system and is intended to be closed at the top by a lid (not shown). The reservoir 12 is made of plastic or other somewhat fragile material and includes a pair of depending integral nipples or the like 14 and 16 which are received and secured in the ports 11 and 13 of the master cylinder 10 by rubber seals 15 and 17 with the interior of each nipple communicating with a passageway 18 and 20 opening into the interior of the master cylinder. In normal operation of the brake system the nipples 14 and 16 direct hydraulic brake fluid in the reservoir into the master cylinder ports 11 and 13. Details of internal construction of the master cylinder are well known in the art and need not be described here. Suffice it that piston means (not shown) within the master cylinder pressurizes the brake fluid within brake lines (not shown) connected to the master cylinder, which lines extend to the brake cylinders at each of the wheels so that pressurization of the brake fluid within the master cylinder causes pressurization at the brake cylinders. Following repair of the brake system as by replacement of component parts, it is necessary to refill the system and bleed any air entrapped therefrom. Heretofore it has been the practice to deliver replacement brake fluid to the system by a device known as a power bleeder in which brake fluid is placed under pressure and delivered to the reservoir. The normal closure cap for the reservoir was removed and a special adapter cap in communication with the power bleeder, was clamped to the reservoir. The power bleeder was operated by air pressure supplied from the compressor at the service garage. By opening the brake lines successively at each of the wheel cylinders, any air could be quickly exhausted.

With the advent of a fragile reservoir such as shown in the drawings, clamping a lid thereto for pressurizing the reservoir as was done heretofore could lead to breakage or rupture of the reservoir. Accordingly, the adapter disclosed herein is intended to effectively bypass the fragile reservoir such that the fluid pressure as well as any clamping forces involved in securing the adapter to the brake system are not carried by the reservoir. In addition, the power bleeder has a tendency to aerate the brake fluid and the adapter shown in this disclosure tends to de-aerate the brake fluid prior to its being delivered into the master cylinder.

In carrying out the invention, a brake bleeder adapter is shown in the drawings as including a body portion 22 having therewithin a pair of chambers 24 and 26 separated by a wall or weir 28. Chamber 26 communicates with the interior of a pair of integral hollow downwardly extending legs 30 and 32, sometimes referred to herein as the leg portion of the adapter. Such legs are intended to extend downwardly through the reservoir with their lower ends disposed within the master cylinder ports and their end faces abutting the bottom 19 and 21 of the master cylinder ports. The body portion 22 is of cylindrical shape, open at its upper end with an O-ring 34 encircling the same adjacent the upper marginal edge.

A cap or lid 36 is intended to close the upper end of the body portion and for this purpose is of inverted cup shape as shown in the drawings with a cylindrical flange 38 overlying the cylindrical side wall of the body portion and bearing against the O-ring 34 to effect a seal therewith. The body portion is provided with a pair of radially extending lugs 40 and 42 which are received within bayonet-type slots 44 formed in the flange of the cap as shown in FIG. 1.

The lower ends of the legs 30 and 32 are intended to communicate with the master cylinder essentially independently of the reservoir to effect a fluid-tight seal within the master cylinder ports as formed by the nipples 14 and 16 of the reservoir as shown in the drawings. This seal is effected by a pair of O-rings 46 and 48 disposed in peripheral slots in the exterior of the legs. Valve means is also provided at the lower ends of the legs to prevent brake fluid within the adapter from draining out of the adapter when the same is removed from the master cylinder, as well as preventing reverse flow of fluid into and possible contamination of the interior of the adapter. Such valve means comprise a generally V-shaped radially outwardly opening peripheral notch 49 within which is seated under slight tension an elastomeric O-ring 50. Small passageways 51 arranged in circumaxially spaced relation around the leg in the bottom of the notches 49 establish communication between the hollow interior of each leg and the V-shaped notch. Provision of this valve means at the lower end of each leg is important in preventing unnecessary dripping of brake fluid as the adapter is being removed from the engine compartment of the vehicle. Such brake fluid often is of a composition having deleterious effects upon the painted surface of an automobile. The lower end face of each leg is provided with a transverse groove or cross slot 52 disposed on a diameter of the leg to permit communication of brake fluid emitted from beneath the valve ring 50 to enter the passageway 18.

Means are provided for delivering the brake fluid under pressure to the adapter chamber 24 close to the bottom thereof, or, in other words, beneath the normal free surface 56 of brake fluid within chamber 24. Such means comprises a pipe of nipple-like structure 58 depending from the underside of the cap or lid 36 and projecting down into the chamber 24 as shown in FIG. 2. The upper end of the nipple communicates with a threaded opening 60 adapted to receive the threaded end of a pressurized brake fluid delivery hose (not shown). At the lower end of the nipple 58 is valve means for preventing reverse flow of brake fluid from the chamber 24 back into the nipple and hose after de-pressurization of the brake fluid in the delivery hose. Such valve comprises an elastomeric O-ring 62 disposed in a V-notch 63 formed between a chamfered surface at the lower end of the nipple and a complementarily chamfered surface of a projecting part 64 secured within the lower end of the nipple 58. Transverse passageways 66 establish communication between the hollow interior of the nipple 58 and the chamber 24 beneath the O-ring valve element 62. Upon pressurization of brake fluid within the delivery hose, and assuming the master cylinder is calling for the delivery of brake fluid, the elastomeric O-ring valve element 62 will be lifted slightly from its normally seated position within the V-groove permitting brake fluid to pass from the interior of the nipple into the chamber 24.

By delivering the brake fluid to the chamber 24 near the bottom thereof and beneath the free surface 56, foaming of the delivered brake fluid is prevented. By causing the brake fluid to spill over the upper edge of wall 28, the fluid tends to be de-aerated in chamber 26 as the bubbles of air in the fluid will tend to enter the atmosphere above surface 68 or will remain at or adjacent the free surface 68 of the brake fluid within chamber 26.

The adapter is retained on the master cylinder by clamp means comprising an arm 70 having a hook-shaped lower end 72 adapted to be received beneath and conform to the somewhat cylindrical surface of the bottom side of the master cylinder. The upper end of the arm extends loosely through a retaining loop 74 integrally formed with the cap 36 with the arm terminating over the central portion of the cap 36 and carrying a thumbscrew 76 adapted to bear upon the cap whereby when the adapter is mounted on the master cylinder with the legs extending down through the reservoir and into the ports of the cylinder, the thumbscrew may be tightened to clamp the adapter to the master cylinder in such position.

In order to charge the adapter with brake fluid preparatory to power brake bleeding, and assuming that a pressurizing hose (not shown) is connected to the threaded port 60 to deliver brake fluid under pressure thereto, the mechanic will first depress a stem 78 of a Schraeder-type valve 80 to unseat the valve head 81 against the tension of spring 82. With the valve 80 open, and the delivery hose pressurized to cause brake fluid to be delivered through the nipple 58 into chamber 24, the brake fluid will rise in such chamber until it spills over the upper edge of wall 28 and into chamber 26. Air within the chambers 24 and 26 will exhaust through valve 80 laterally out of small passageways 83 in the valve body beneath a cover 84 which overlies a radially extending channel 86 communicating at one end with the passageways 83 and at the other end opening beneath a depending flange 88 on the cover through an undercut 90 in the cap 36.

As the brake fluid rises in chamber 26 it contacts the lower edge of a cylindrical wall 92 depending from the cap 36 in surrounding relation with the Schraeder valve 80. Wall 92 defines a brake fluid sensing compartment opening downwardly into chamber 26, with the lower edge of the wall being slightly below the top of weir 28. As soon as the brake fluid reaches the lower edge of the wall 92 it will rise much more rapidly within the sensing compartment than in chamber 26 outside the wall and brake fluid will shortly be visible to the mechanic as it drains from the undercut 90 beneath the cover 84. Such escaping brake fluid will signal to the mechanic that the adapter is fully charged. This condition is reached when the free surface 68 of the brake fluid is spaced slightly below the upper edge of weir 28. Any brake fluid escaping through valve 80 will drain into the reservoir 12. With the adapter thus fully charged, the stem of the valve 80 is released to close the valve and the space within the wall 92 is then sealed against the further escape of fluid and pressure will build within chamber 26 and in turn at the master cylinder ports and within the brake lines and the mechanic may proceed with bleeding the brake system.

It will be noted that the clamping action by the clamp 70 and thumbscrew 76 is independent of the reservoir, viz., imposes no clamping force on the fragile reservoir 12; rather such clamping forces are taken by the bottom walls 19 and 21 of the cylinder ports which walls are part of the master cylinder itself. Only the fluid pressure trapped beneath the O-rings 46 and 48 at the entrance to the master cylinder will be felt by the reservoir and in this area the cylindrical configuration of the reservoir and its close support by adjacent surfaces of the master cylinder make it well able to withstand the fluid pressure involved.

During the replenishment of brake fluid in the master cylinder by the fluid in chamber 26, fluid in chamber 24 will spill over weir 28 into chamber 26 with the result that the brake fluid in chamber 26 will be de-aerated so that only de-aerated fluid will enter legs 30 and 32. The level 68 of brake fluid in chamber 26 will remain substantially as shown during bleeding of a brake system and the mechanic can periodically depress the valve stem 78 to check the level of fluid in the adapter.

What is claimed is:

1. A brake bleeder adapter for use with a master cylinder having an upwardly open fragile reservoir thereon, comprising, in combination:
    a body portion having a hollow interior for receiving hydraulic brake fluid under pressure,
    means for de-aerating pressurized brake fluid delivered to the body portion,
    a hollow leg portion on the body portion communicating with de-aerated fluid therein to be extended down through the upwardly open reservoir for communication with the master cylinder essentially independent of the reservoir,
    means for removably sealing the leg portion in the aforesaid relation to the master cylinder, and
    means for cooperating with the adapter and master cylinder independently of the reservoir to releasably retain the leg portion in the aforesaid relation with the master cylinder.

2. The invention defined by claim 1 wherein one-way valve means is provided at the free end of the leg portion for preventing escape of brake fluid therefrom upon depressurization of brake fluid delivered to the body portion.

3. The invention defined by claim 1 wherein said leg portion comprises two legs each communicating with the body portion to receive brake fluid therefrom and each adapted to communicate with upwardly opening ports in the master cylinder.

4. The invention defined by claim 1 wherein the hollow interior of the body portion is divided by a weir into two chambers one of which communicates with the hollow leg portion and the other of which receives hydraulic fluid under pressure, said weir providing a de-aerating means within the body portion.

5. The invention defined by claim 4 wherein a lid is attached to the body portion to close over the two chambers, sealing means between the lid and body portion, and means for releasably holding the lid as aforesaid on the body portion.

6. The invention defined by claim 4 wherein said other chamber includes fluid delivery means for delivering brake fluid under pressure below the free surface of brake fluid in the chamber.

7. The invention defined by claim 6 wherein one way valve means are provided on said fluid delivery means for preventing reverse flow of fluid out of said other chamber into the fluid delivery means.

8. The invention defined by claim 1 wherein said leg portion has an end face for abutting the bottom of an upwardly opening port in the master cylinder and said clamping means have portions extending beneath the master cylinder and engaging the body portion of the adapter for securing the adapter to the master cylinder with the leg portion in the aforesaid position.

9. The invention defined by claim 1 wherein said sealing means are operable to seal the leg portion with the master cylinder essentially independently of the reservoir.

10. The invention defined by claim 1 wherein means are provided on the body portion for leaking brake fluid therefrom when the hollow interior has been charged with a predetermined quantity thereof.

11. The invention defined by claim 10 wherein said means includes a liquid sensing compartment opening downwardly into the hollow interior of the body portion, and valve means at the upper end of the compartment for establishing controlled communication of the compartment with the exterior of the body portion.

12. A brake bleeder adapter for use with a master cylinder having an upwardly opening fragile reservoir thereon, comprising, in combination:
    an upwardly opening body portion having a hollow interior,
    a lid removably closing the upwardly opening body portion,
    means for fluid tightly sealing the lid and body portion,
    a weir within the hollow interior of the body portion dividing it into two chambers,
    a pair of hollow legs integral with the body portion and extending downwardly therefrom and communicating with one of said chambers,
    means at the lower ends of said legs for sealing them in fluid-tight communication with the master cylinder essentially independently of the reservoir,
    brake fluid delivery means for delivering brake fluid under pressure to the other of said chamber beneath the normal surface of brake fluid therein,
    brake fluid sensing means in said one chamber for sensing the level of brake fluid when the same is slightly below the upper edge of said weir, and
    valve means on said legs for preventing leakage of brake fluid therefrom upon discontinuance of fluid pressure on the adapter and disconnection of the legs from the master cylinder.

* * * * *